US008614579B2

(12) United States Patent  
Forgang et al.

(10) Patent No.: US 8,614,579 B2  
(45) Date of Patent: Dec. 24, 2013

(54) ACTIVE STANDOFF COMPENSATION IN MEASUREMENTS WITH OIL-BASED MUD RESISTIVITY IMAGING DEVICES

(75) Inventors: Stanislav Wilhelm Forgang, Houston, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 218 days.

(21) Appl. No.: 13/186,922

(22) Filed: Jul. 20, 2011

(65) Prior Publication Data

US 2012/0074946 A1  Mar. 29, 2012

Related U.S. Application Data

(60) Provisional application No. 61/386,630, filed on Sep. 27, 2010.

(51) Int. Cl.  
*G01V 3/30* (2006.01)

(52) U.S. Cl.  
USPC ............................................ 324/355; 324/357

(58) Field of Classification Search  
USPC .................................................. 324/355, 357  
See application file for complete search history.

(56) References Cited

U.S. PATENT DOCUMENTS

| 7,432,716 B2 | 10/2008 | Forgang et al. |
| 2005/0068036 A1 | 3/2005 | Wang et al. |
| 2005/0075853 A1 | 4/2005 | Spross |
| 2006/0132128 A1 | 6/2006 | Freedman et al. |
| 2010/0019772 A1 | 1/2010 | Gorek |

OTHER PUBLICATIONS

Notification of Transmittal of the International Search Report and the Written Opinion of the International Searching Authority, or the Declaration; PCT/US2011/050654; Feb. 28, 2012.

Pavlovic, Mitch D. et al., Field Test Results of a new Oil-Based Micro-Resistivity Imaging Instrument in Canada, Journal, 2-6 2003 1-11, Canadiam Society of Petroleum Geologists.

*Primary Examiner* — Reena Aurora  
(74) *Attorney, Agent, or Firm* — Cantor Colburn LLP

(57) ABSTRACT

Disclosed is an apparatus for estimating a property of an earth formation penetrated by a borehole having a substantially non-conducting liquid. The apparatus includes: a downhole tool having a transmitter electrode configured to convey an electric current into the earth formation. A measurement electrode is configured to receive the electric current from the earth formation, wherein the electric current bridges as least one of a first gap between the transmitter electrode and the formation and a second gap between the measurement electrode and the formation. A compensating circuit coupling the transmitter electrode to the measurement electrode is configured to reduce a reactive component of a total current received by the measurement electrode. A receiver coupled to the measurement electrode is configured to measure the total current to estimate the property.

20 Claims, 4 Drawing Sheets

ACTIVE STANDOFF COMPENSATION IN MEASUREMENTS WITH OIL-BASED MUD RESISTIVITY IMAGING DEVICES

CROSS-REFERENCE TO RELATED APPLICATIONS AND PRIORITY CLAIM

This application claims the benefit of U.S. Provisional Application Ser. No. 61/386,630, entitled "ACTIVE STAND-OFF COMPENSATION IN MEASUREMENTS WITH OIL-BASED MUD RESISTIVITY IMAGING DEVICES," filed Sep. 27, 2010, under 35 U.S.C. §119(e), which is incorporated herein by reference in its entirety.

BACKGROUND

1. Field of the Invention

The invention disclosed herein relates to investigations of an earth formation penetrated by a borehole having non-conductive mud and, more specifically, to accurately measuring the resistivity of the earth formation and providing an accurate image from the measuring.

2. Description of the Related Art

A borehole is typically drilled into a geologic formation for various applications such as carbon sequestration, geothermal production, and hydrocarbon exploration and production. In order to efficiently use expensive drilling resources, it is important to acquire detailed information concerning the properties of the geologic formation.

A logging or downhole tool can be used to acquire this information. The tool is disposed in the borehole by wireline for wireline logging or in a collar attached to a drill string for logging-while-drilling applications. Many different types of tools can be used to measure different properties of the formation.

One type of tool is a galvanic logging tool used to measure the resistivity of the formation as a function of depth in the borehole. Variations in the measured resistivity can be plotted to produce a resistivity image of the formation. In order to measure the resistivity, the galvanic logging tool injects alternating electric current into the formation using an electrode. The electric current is then received by another electrode coupled to apparatus for measuring the electrical characteristics of the received current. The active part of the impedance of the formation to the flow of current is primarily related to the resistivity of the formation. Hence, measured electrical characteristics of the received current can be used to determine the resistivity of the formation.

If any of the electrodes are not in direct contact with the wall of the formation (i.e., borehole wall) due to borehole rugosity, for example, the electric current must cross a gap, referred to as "standoff," between the corresponding electrode and the borehole wall. When a borehole is drilled through water-soluble formations, oil-based drilling muds must be used for lubricating and cooling the drill bit and flushing the cuttings from the borehole. An oil-based drilling mud is non-conductive and, thus, can further impede the electric current and reduce the accuracy of conventional resistivity imaging devices. Improving galvanic resistivity imaging in a non-conducting mud environment would be well received in the art.

BRIEF SUMMARY

Disclosed is an apparatus for estimating a property of an earth formation penetrated by a borehole having a substantially non-conducting liquid. The apparatus includes: a downhole tool having a transmitter electrode configured to convey an electric current into the earth formation. A measurement electrode is configured to receive the electric current from the earth formation, wherein the electric current bridges as least one of a first gap between the transmitter electrode and the formation and a second gap between the measurement electrode and the formation. A compensating circuit coupling the transmitter electrode to the measurement electrode is configured to reduce a reactive component of a total current received by the measurement electrode. A receiver coupled to the measurement electrode is configured to measure the total current to estimate the property.

Also disclosed is a method for estimating a property of an earth formation penetrated by a borehole having a substantially non-conducting drilling fluid, the method includes: conveying a carrier through the borehole; transmitting an electric current into the formation using a power source coupled to a transmitter electrode disposed at the carrier; receiving the electric current using a receiver coupled to a measurement electrode disposed at the carrier, wherein the electric current bridges as least one of a gap between the transmitter electrode and the formation and a gap between the measurement electrode and the formation; injecting a compensating electric current into the measurement electrode using a compensating circuit coupling the power source to the measurement electrode wherein the compensating current is configured to reduce a reactive component of a total current received by the measurement electrode; and estimating the property using the total current received by the measurement electrode.

Further disclosed is a non-transitory computer-readable medium having computer-executable instructions for estimating a property of an earth formation penetrated by a borehole by implementing a method that includes: transmitting an electric current into the formation using a power source coupled to a transmitter electrode disposed in the borehole; receiving the electric current using a receiver coupled to a measurement electrode disposed in the borehole, wherein the electric current bridges as least one of a gap between the transmitter electrode and the formation and a gap between the measurement electrode and the formation; injecting a compensating electric current into the measurement electrode using a compensating circuit coupling the power source to the measurement electrode wherein the compensating current is configured to reduce a reactive component of a total current received by the measurement electrode; and estimating the property using the total current received by the measurement electrode.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method is presented herein by way of exemplification and not limitation with reference to the Figures.

Figure 1:
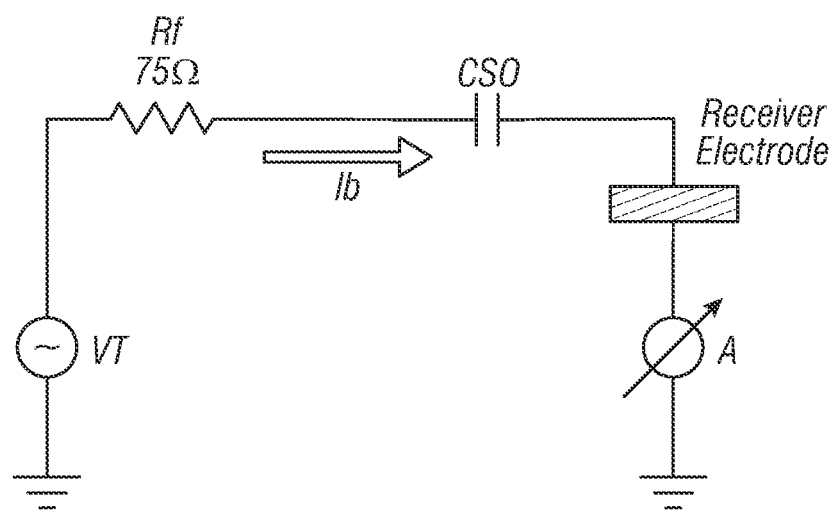
FIG. 1 illustrates an equivalent circuit of a prior art resistivity tool disposed in a borehole penetrating the earth.

For reference purposes, an equivalent circuit of a prior art resistivity tool is illustrated in FIG. 1. Particularly, due to a signal from a harmonic voltage source of voltage VT connected to a transmitter plate mounted on an electrode pad surface, a harmonic electrical current Ib appears in a loading network external to the tool. The electrical current flows through a resistive geologic formation represented by resistor Rf and one or more non-conductive gaps (having non-conductive mud, invaded formation, etc.) represented by a capacitor CSO. After flowing through the capacitor CSO, the electrical current flows back to the source through a receiver electrode and ammeter A having no intrinsic impedance. The gap between the pad and the formation is referred to as a pad standoff. For most challenging measurements with one or more ten-button electrode pads, for example, Rf is expected to be close to a hundred or less Ohms and CSO is expected to be about one pF (for approximately 0.25 inch standoff in boreholes filled with oil-based mud having an dielectric permittivity of about 10).

The main issue using the prior art resistivity tool is not a large complex network impedance, but rather a quite high ratio of its measured imaginary-to-real current components. These two current components are measured as a vector sum. For instance, in one example, the overall high impedance (and conversely low admittance) could be mitigated by raising VT to satisfy a voltage measurement threshold. However, the above imaginary-to-real current component ratio raises the main concern as it results in the high phase angle of the vector sum current Ib (close to +90 degrees with respect to VT). A complex current with such a high phase angle would have very low sensitivity of its magnitude and phase to variations of Rf. Raising VT will not change the phase relationships in the measured current Ib; however, it may introduce elevated requirements on the phase detection scheme, which is built into the ammeter A in one example.

The techniques disclosed herein improve galvanic resistivity imaging by compensating for the imaginary component of the current received by a measuring electrode, thus, making the real component of the vector-sum more accurately and precisely measured. The techniques, which include apparatus and method, call for introducing a circuit having compensating circuitry between a transmitter plate and the measurement electrode. The compensating circuitry is configured to reduce the imaginary component of the electrical current received by the measurement electrode. The techniques are now discussed in further detail with respect to the embodiments presented.

Figure 2:
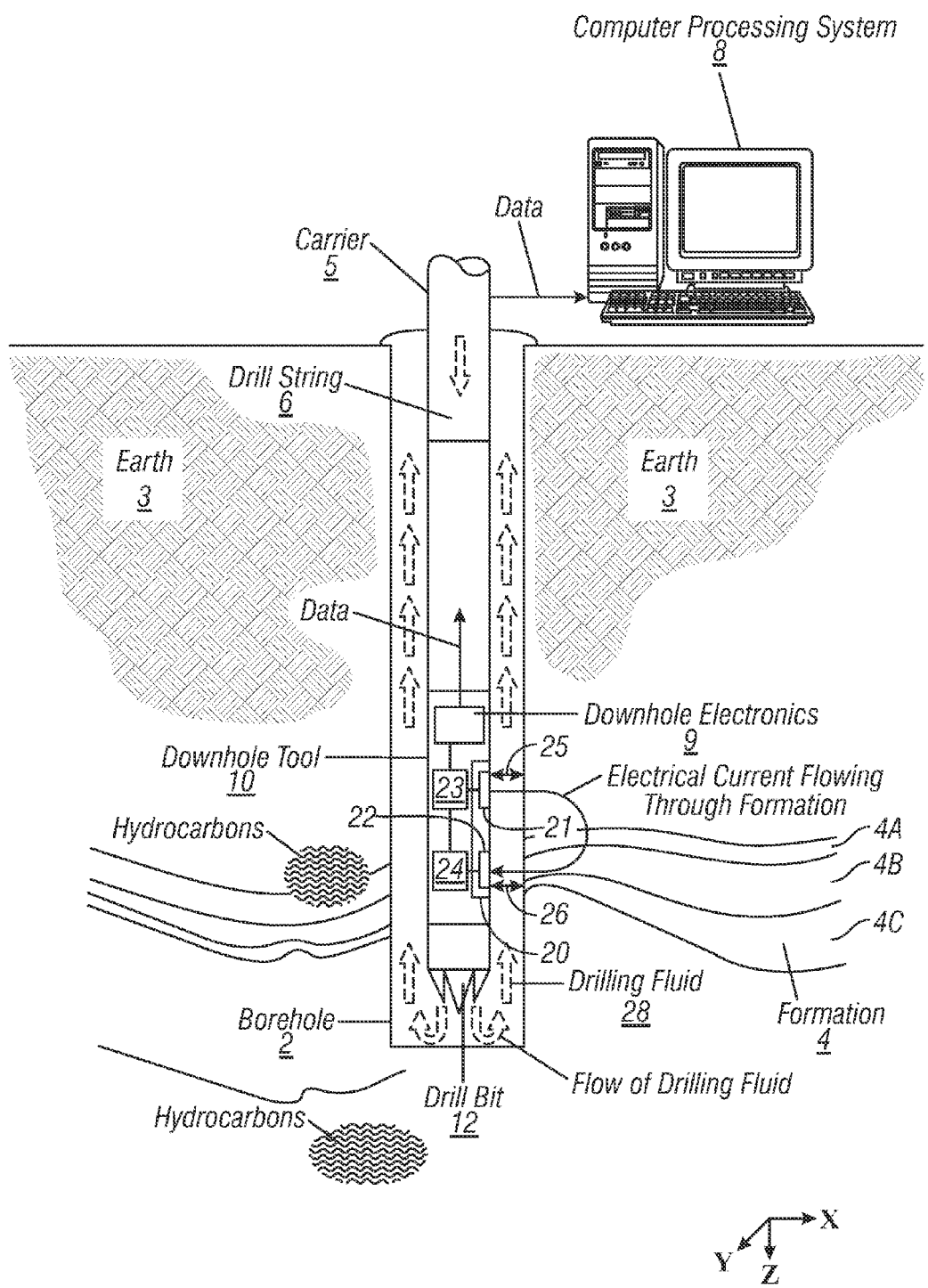
FIG. 2 illustrates an exemplary embodiment of a galvanic resistivity imaging tool disposed in a borehole penetrating the earth.

FIG. 2 illustrates an exemplary embodiment of a downhole tool 10 disposed in a borehole 2 penetrating the earth 3, which includes an earth formation 4 having layers 4A, 4B, and 4C. The downhole tool 10 is conveyed through the borehole 2 by a carrier 5. In the embodiment of FIG. 1, the carrier 5 is a drill string 6 for applications referred to as logging-while-drilling (LWD) or measurement-while-drilling (MWD). Thus, while the borehole 2 is being drilled or during a temporary halt in drilling, the downhole tool 10 can perform measurements of a property of the formation 4. In wireline logging applications, the carrier 5 is an armored wireline, which can support the downhole tool 10 and provide communications capability. In order to operate the downhole tool 10 and/or provide a communications interface with a surface computer processing system 8, the downhole tool 10 includes downhole electronics 7.

The downhole tool 10 in the embodiment of FIG. 2 is configured to measure the resistivity of the formation 4. The resistivity can be measured as a function of depth and variations in the resistivity can be plotted or displayed to produce a resistivity image of the formation 4. Still referring to FIG. 2, the downhole tool 10 includes a transmitter electrode 21 disposed on a pad 20. The pad 20 in wireline logging applications can be configured to extend from the downhole tool 10 to make best possible contact with the borehole 2. A power source 23 coupled to the transmitter electrode 21 is configured to inject alternating electrical current Ib at voltage VT and frequency f into the formation 4 across a first gap 25. The injected electrical current Ib is received by a measurement electrode 22 after flowing across a second gap 26. The borehole 2 and, thus, the first gap 25 and the second gap 26 are filled with oil-based drilling mud (or fluid) 28, which is substantially non-conductive. The measurement electrode 22 is coupled to a receiver 24, which is configured to measure the magnitude of the total received current and the phase angle of the total received current with respect to the voltage VT at the transmitter electrode 21.

It can be appreciated that the transmitter electrode 21 and the measurement electrode 22 can have various shapes and sizes. In one embodiment, the measurement electrode 22 can have a round shape and, thus, be referred to as a "button" electrode. In one embodiment, the transmitter electrode 21 can be a metal plate or a metal portion of a body of the downhole tool 10.

It can be appreciated that the power source 23 can be a multi-frequency power source configured to transmit the electric current Ib sequentially at multiple frequencies. The resistivity of the formation 4 can then be estimated from the measurements performed at the multiple frequencies.

It can be appreciated that in addition to measuring the resistivity or its inverse conductivity of the formation 4 the downhole tool 10 can also estimate locations of boundaries between the formation layer 4A, 4B, and 4C.

Figure 3:
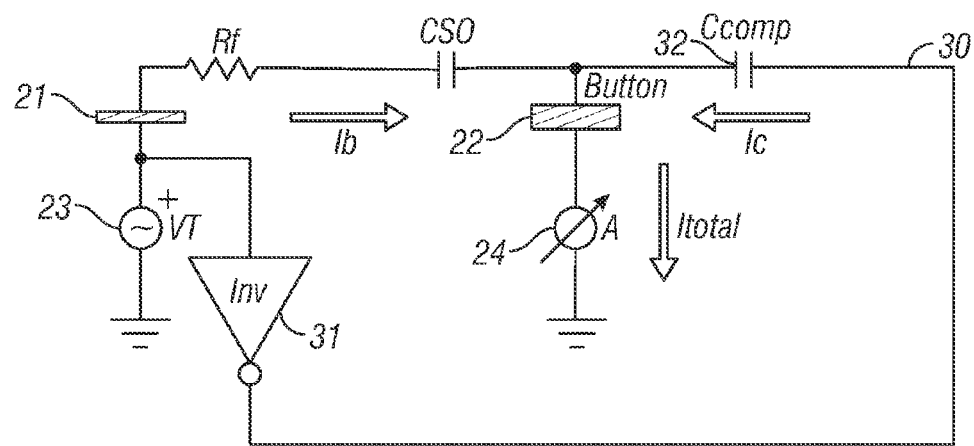
FIG. 3 illustrates an equivalent circuit of the galvanic resistivity imaging tool disposed downhole.

Reference may now be had to FIG. 3, which illustrates an equivalent circuit of the downhole tool 10 disposed in the borehole 2. To overcome the problem with increasing equivalent gap capacitance CSO, a compensating circuit 30 from the transmitter electrode 21 to the measurement electrode 22 is introduced in the pad 20. The compensating circuit 30, which may be included in the downhole electronics 9, includes an analog inverter 31 coupled in series with a compensation capacitor (Ccomp) 32. In general, the value of Ccomp is close to CSO, but does not have to exactly equal CSO. The value of CSO can be found using a mathematical model, experimental calibration, or a combination thereof.

Still referring to FIG. 3, current Ic flowing through the compensating circuit 30 and receiver 24 compensates (i.e., reduces) the reactive component of the formation current Ib and, thus, the total button current Itotal is dominated by the real component. The real part of the total button current Itotal, which flows through the formation 4, remains identical to the real part of the total button current Itotal prior to the addition of the compensating circuit 30.

In the embodiment of FIG. 3, the formation resistance Rf can be determined by dividing the applied voltage VT by the total current Itotal received by the measurement electrode 22 and taking the real part of the division result into account. Apparently, if the imaginary component of the total received current is zero or very close to zero, then Rf can be determined by dividing VT by the magnitude of the total received current Itotal.

It is recognized that if both the transmitter electrode 21 and the button electrode 22 are in galvanic contact with a conductive formation 4, then the current Ib has only a real component and, thus, the compensating circuit 30 will not produce a compensating current.

An important feature of the techniques disclosed herein is the fact that with decreasing standoff the current Ic always remains smaller than the imaginary part of Ib. In this case, the return to reactive impedance exceeding and dominating the button network impedance is avoided and measurements are not degraded compared to the non-compensated scheme. Moreover, the compensation would continue reducing the overall reactive impedance.

An advantage of the techniques disclosed herein is that a separate compensating circuit 30 can be used with each measurement electrode 22 for embodiments that include more than one measurement electrode 22. The compensating circuit 30 can be incorporated into existing pads 20 without significant hardware changes. In addition, access to the compensating circuit 30 in the pad 20 allows for selecting compensation components and/or values of the components depending on logging conditions. In one embodiment, component values are selected based on the minimal expected values of CSO and Rf. If there is no reliable information regarding those minimal expected values, then the embodiment of FIG. 3 can be configured to provide a sweep of values for the compensation capacitor (Ccomp) 32.

In one embodiment having more than one measurement electrode 22 where each is coupled to an associated compensating circuit 30, measurements with each measurement electrode 22 may be performed sequentially in order to avoid interference with measurements made by the other measurement electrodes 22.

In one embodiment having more than one measurement electrode 22 where each is coupled to an associated compensating circuit 30, each compensating circuit 30 can have different component values to avoid removing the downhole tool 10 from the borehole 2 in order to change component values to other values for certain logging conditions.

Figure 4:
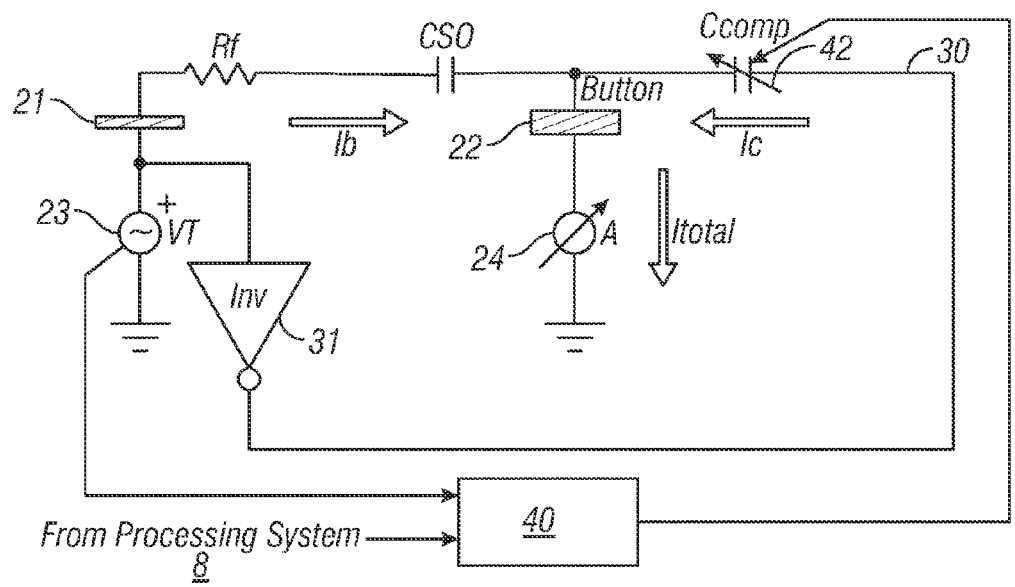
FIG. 4 illustrates an equivalent circuit of the galvanic resistivity imaging tool having a compensation circuit.

In various embodiments, the compensation current Ic can have a complex shape, be adjustable, and/or be independent for each measurement electrode 22. In one embodiment, as shown in FIG. 4, a controller 40 is coupled to a variable compensating capacitor 42 that is configured to have its capacitance value selected remotely. In one embodiment, the controller 40 is configured to receive input from the surface computer processing system 8 to select the capacitance value of the variable capacitor 42. In one embodiment, the controller 40 is configured to receive the value of VT from the power source 23 and the magnitude and phase angle of the total received current Itotal from the receiver 24 as inputs and then automatically select a capacitance value for the variable capacitor 42 that reduces the imaginary component of Itotal. In general, the controller 40 can be configured to control components in the compensating circuit 30 in order to select at least one of a magnitude and a phase angle of compensating current Ic flowing from the compensating circuit 30 to the measurement electrode 22.

It is noted that in one embodiment for the compensating circuit 30 to work non-inverting inputs to button amplifiers are required to be at "virtual" ground (common) potential.

Figure 5:
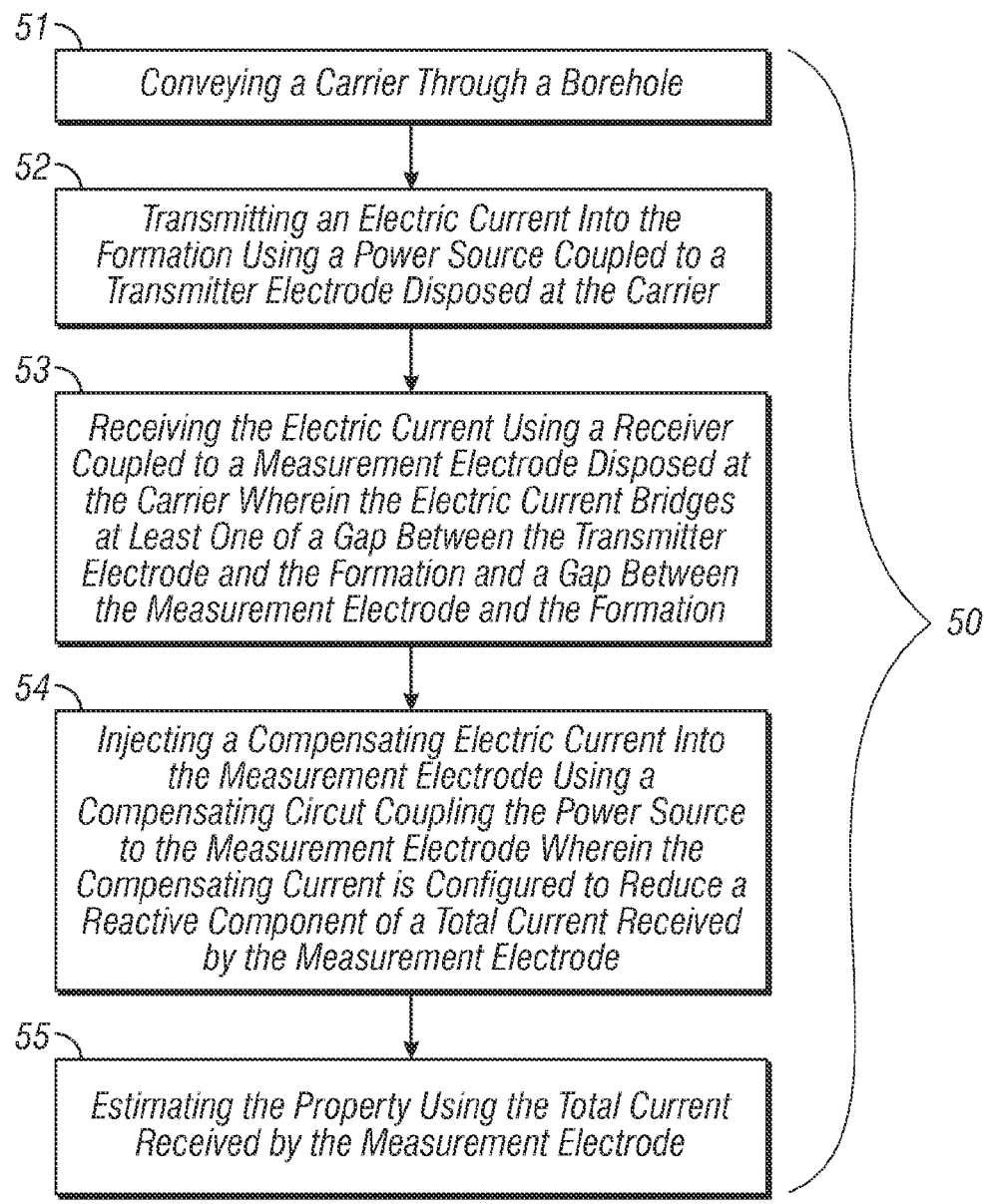
FIG. 5 presents one example of a method for estimating a property of an earth formation.

FIG. 5 presents one example of a method 50 for estimating a property of an earth formation penetrated by a borehole. The method 50 calls for (step 51) conveying a carrier through the borehole. Further, the method 50 calls for (step 52) transmitting an electric current into the formation using a power source coupled to a transmitter electrode disposed at the carrier. Further, the method 50 calls for (step 53) receiving the electric current using a receiver coupled to a measurement electrode. The electric current bridges as least one of a gap between the transmitter electrode and the formation and a gap between the measurement electrode and the formation. Further, the method 50 calls for (step 54) injecting a compensating electric current into the measurement electrode using a compensating circuit coupling the transmitter to the measurement electrode. The compensating current is configured to reduce a reactive component of a total current received by the measurement electrode. Further, the method 50 calls for (step 55) estimating the property using the total current received by the measurement electrode.

In support of the teachings herein, various analysis components may be used, including a digital and/or an analog system. For example, the downhole electronics 5, the surface computer processing 6, or the electronic monitoring device 9 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling two devices either directly or indirectly through an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An apparatus for estimating a property of an earth formation penetrated by a borehole having a substantially non-conducting drilling fluid, the apparatus comprising:
    a downhole tool configured to be conveyed through the borehole;
    a transmitter electrode disposed at the downhole tool and configured to convey an electric current into the earth formation;
    a power source coupled to the transmitter electrode and configured to transmit the electric current to the transmitter electrode;
    a measurement electrode disposed at the downhole tool and configured to receive the electric current from the earth formation, wherein the electric current bridges at least one of a first gap between the transmitter electrode and the formation and a second gap between the measurement electrode and the formation;
    a compensating circuit configured to reduce a reactive component of a total current received by the measurement electrode; and
    a receiver coupled to the measurement electrode and configured to measure the total current to estimate the property.

2. The apparatus according to claim 1, wherein the transmitter electrode, the measurement electrode, and the compensating circuit are disposed in a pad.

3. The apparatus according to claim 1, wherein the compensating circuit is coupled to the transmitter electrode.

4. The apparatus according to claim 1, further comprising a controller coupled to the compensating circuit and configured to select at least one of a magnitude and a phase angle of compensating current flowing from the compensating circuit to the measurement electrode.

5. The apparatus according to claim 4, wherein the controller is coupled to a compensating capacitor in the compensating circuit and configured to select a capacitance of the compensating capacitor.

6. The apparatus according to claim 1, wherein the compensating circuit comprises a compensating capacitor.

7. The apparatus according to claim 6, wherein the compensating circuit further comprises an analog inverter in series with the compensating capacitor.

8. The apparatus according to claim 1, wherein the receiver is configured to measure at least one of a magnitude and a phase angle of the electric current.

9. The apparatus according to claim 1, wherein the power source is a multi-frequency power source and the receiver is configured to measure the electric current at each frequency to estimate the property.

10. The apparatus according to claim 1, wherein the property is resistivity.

11. The apparatus according to claim 1, further comprising a carrier coupled to the downhole tool.

12. The apparatus according to claim 11, wherein the carrier comprises one of a wireline, a slickline, a drill string, and coiled tubing.

13. A method for estimating a property of an earth formation penetrated by a borehole having a substantially non-conducting drilling fluid, the method comprising:
    conveying a carrier through the borehole;
    transmitting an electric current into the formation using a power source coupled to a transmitter electrode disposed at the carrier;
    receiving the electric current using a receiver coupled to a measurement electrode disposed at the carrier, wherein the electric current bridges at least one of a gap between the transmitter electrode and the formation and a gap between the measurement electrode and the formation;
    injecting a compensating electric current into the measurement electrode using a compensating circuit coupling the power source to the measurement electrode wherein the compensating current is configured to reduce a reactive component of a total current received by the measurement electrode; and
    estimating the property using the total current received by the measurement electrode.

14. The method according to claim 13, wherein the property is resistivity.

15. The method according to claim 14, further comprising producing a resistivity image.

16. The method according to claim 13, wherein the property is a boundary between formation layers.

17. The method according to claim 13, further comprising adjusting a value of a component in the compensating circuit with a controller to reduce the reactive component of the total current received by the measurement electrode.

18. The method according to claim 17, wherein the component comprises a compensating capacitor.

19. The method according to claim 13, further comprising transmitting the electric current at a plurality of frequencies and estimating the property using the total current received at the plurality of frequencies.

20. A non-transitory computer-readable medium comprising computer-executable instructions for estimating a property of an earth formation penetrated by a borehole by implementing a method comprising:
    transmitting an electric current into the formation using a power source coupled to a transmitter electrode disposed in the borehole;
    receiving the electric current using a receiver coupled to a measurement electrode disposed in the borehole, wherein the electric current bridges at least one of a gap between the transmitter electrode and the formation and a gap between the measurement electrode and the formation;
    injecting a compensating electric current into the measurement electrode using a compensating circuit coupling the power source to the measurement electrode wherein the compensating current is configured to reduce a reactive component of a total current received by the measurement electrode; and
estimating the property using the total current received by the measurement electrode.

* * * * *